June 8, 1943.   J. E. HIGGINS   2,321,083
OPHTHALMIC MOUNTING
Filed Nov. 22, 1940
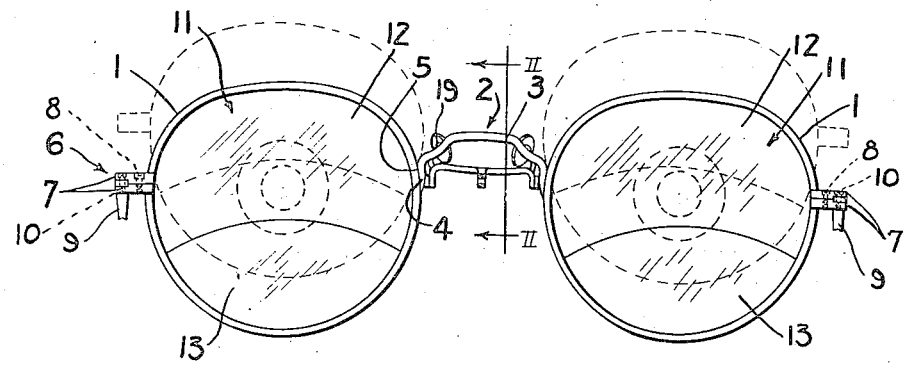
Fig. I
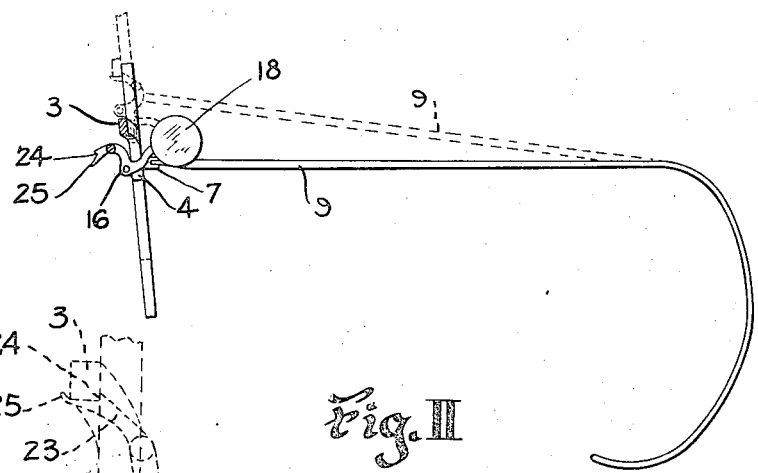
Fig. II
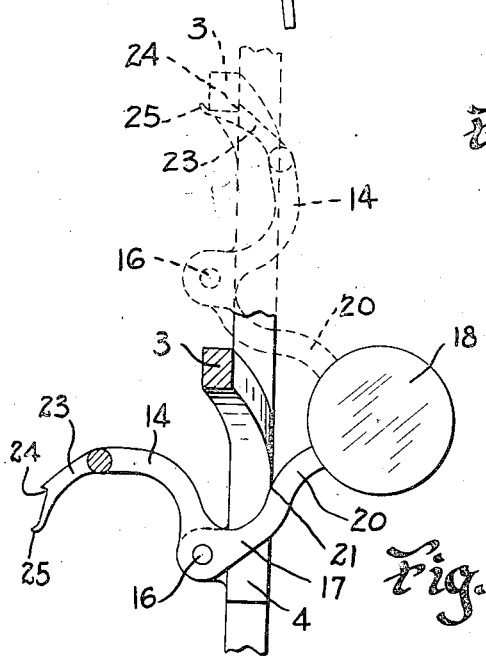
Fig. III
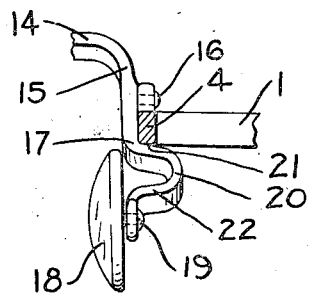
Fig. IV
INVENTOR
JOSEPH E. HIGGINS
BY Louis L. Gagnon
ATTORNEY Patented June 8, 1943

2,321,083

UNITED STATES PATENT OFFICE 2,321,083

OPHTHALMIC MOUNTING

Joseph E. Higgins, Grand Island, Nebr., assignor to American Optical Company, Southbridge, Mass., a voluntary association of Massachusetts Application November 22, 1940, Serial No. 366,684

5 Claims. (Cl. 88—49)

This invention relates to improvements in ophthalmic mountings and has particular reference to novel means for raising and lowering the position of the lenses of said mountings before the eyes.

One of the principal objects of the invention is to provide novel means for making an ophthalmic mounting for use with lenses having different focal fields, whereby said focal fields may be moved upwardly or downwardly to different positions of use before the eyes.

Another object is to provide a simple, efficient, and compact construction of the character described, functioning, in one position of adjustment, in cooperative relation with the pull of the temples, which support the mounting on the face, for retaining said adjusted position, and in another position of adjustment having mechanical means for retaining said position of adjustment.

Another object is to provide simple, compact, and positive functioning means for locating and retaining the lenses in a comfortable position of use before the eyes and which will afford ease and simplicity of adjustment.

Other objects and advantages of the invention will become apparent from the following description taken in connection with the accompanying drawing, and it will be apparent that many changes may be made in the details of construction and arrangement of parts shown and described without departing from the spirit of the invention as expressed in the accompanying claims. The invention, therefore, is not to be limited to the exact details of construction and arrangement of parts shown and described, as the preferred form only has been given by way of illustration.

Referring to the drawing:

Fig. I is a front elevation of an ophthalmic mounting embodying the invention and showing in dotted lines the mounting in a different adjusted position;

Fig. II is a sectional view taken as on line II—II of Fig. I showing the temple extended and illustrating the position of the parts at different adjustments;

Fig. III is an enlarged fragmentary sectional view through the bridge, illustrating the different adjusted positions of the parts thereof for supporting the lenses in either a raised or lowered position;

Fig. IV is a fragmentary sectional view through a depending side portion of the bridge showing the nose pad supporting arm and its function as stop-means and means for adjusting the pads to desired adjusted relation with each other.

The present invention is directed particularly to the provision of a supporting structure for use with multifocal lenses which will permit the different focal fields of said lenses to be moved to the most comfortable position of use for near or distance vision whereby one or the other of said focal fields will not hinder or interfere with vision through said respective fields during their selected use.

Many attempts have been made to provide a mounting whereby the lenses could be raised or lowered before the eyes so that the different focal fields could be moved into and out of desired position of use, but most of said prior art constructions were complicated structurally, difficult to operate, and undesirable from the aesthetical viewpoint.

The present invention, therefore, is directed particularly to the provision of an ophthalmic mounting so constructed to overcome all of the difficulties set forth above through the provision of simple, durable, and efficient means whereby the near vision fields of multifocal lenses may be quickly and easily raised or lowered, as desired, and will retain their positions of adjustment during use.

Referring more particularly to the drawing wherein like characters of reference designate like parts throughout the several views, the invention broadly comprises a pair of lens-holding rims 1 joined by a main bridge member 2. The said bridge may be of any of the conventional types used in the ophthalmic art. In this particular instance, however, the bridge preferably comprises a central arch portion 3 and depending side portions 4. The depending side portions 4 are joined with the lens rims 1 or other suitable lens holding means, such as a conventional rimless lens strap, as by soldering, welding, or the like, as illustrated at 5.

The lens rims 1 are divided, as illustrated at 6, and the divided ends thereof are provided with conventional connecting lugs 7 secured together by a screw or other suitable means 8. The lugs 7 also afford connecting means to which suitable temples 9 are pivotally attached as illustrated at 10.

The lens holding rims 1 are adapted to support the lenses 11 in connected relation with the mounting. The said lenses 11, in this particular instance, are commercially known as bifocal lenses which comprise a distance field 12 and a near vision field 13. It is to be understood, however, that the invention may be used with lenses having two or more focal fields, as desired.

The central arch portion 3 and depending side portions 4 of the bridge are preferably formed of material having sufficient rigidity as to resist bending and distortion during the use of the mounting. An auxiliary bridge member having a central arch portion 14 and depending side portions 15 is pivotally attached, as illustrated at 16, adjacent the depending side portions 4 of the main bridge member. The said auxiliary bridge supports a pair of rearwardly extending arms 17 to which suitable nose bearing pads 18 are pivotally attached, as illustrated at 19. The arms 17 have outwardly curving loops 20 intermediate the ends thereof, the forward portion 21 of which functions as stop-means for limiting the upward movement of the arms through engagement with the rear surface of the depending side portion 4 of the same bridge member. The inwardly extending portion 22 of the loops 20 provides means for adjusting or altering the distance between the respective nose bearing pads 18 according to the requirements of the individual to whom the mounting is fitted for permanent use.

The auxiliary bridge, as shown in Fig. III, is provided with a forwardly extending arm 23 secured adjacent one end thereof intermediate the central arch portion 14 of the auxiliary bridge as by soldering, welding, or the like. The opposite or free end of the arm 23 is notched as illustrated at 24 so as to latch with the central arch portion 3 of the main bridge member with the nose bearing pads 18 now in their lowermost position with respect to the main bridge member. The arm 23 is preferably formed resilient so that it will yield sufficiently to permit the notched end portion 24 thereof to automatically latch with the central arch portion 3 of the main bridge member when the nose bearing pads 18 are swung in a downward direction about the pivots 16.

When the nose bearing pads 18 are in a raised position as illustrated in Fig. III, with respect to the main bridge 2, the outwardly curving portions 21 of the loops 20 will automatically engage the rear surfaces of the depending portions 4 and thereby limit the upward movement of the pads 18 about the pivot 16. It is apparent that by varying the distance between the centers of the pivots 16 and the outwardly extending portions 21, the uppermost position of adjustment of the nose bearing pads 18 may be varied. The practical arrangement is to so arrange the strap 21 and latch 24 as to cause the nose bearing pads 18 to be substantially equi-distant from the lenses in both the raised and lowered positions.

Although applicant has shown but one notch 24, it is to be understood that the said arm 23 may be provided with two or more notches longitudinally thereof, so that the amount of upward adjustment of the lenses on the face may be varied according to the particular notch selected.

The arrangement is such that when the nose bearing pads 18 are located above the pivot 16, the pull of the temple or temples 9 will tend to cooperate with the action of gravity to retain the pads 18 in their raised position with the strap 21 engaging the rear surface of the depending portion 4. When the said nose bearing pads 18 are located below the pivot 16, the latch member 24 or other adjacent latch portions or notches on the arm 23 engaging with the central arch portion 3 of the main bridge member will mechanically retain the nose bearing pads in a fixed position below the pivot 16.

When it is desired to release the latch 24 from the central arch portion 3 of the main bridge member, in order to permit the nose bearing pads to be moved to a position above the pivot 16, it is merely necessary to exert a slight downward pressure on the end 25 of the arm 23. The said arm 23 being resilient in nature allows the said latch portion 24 to be swung clear of the central arch portion 3, and said downward pressure in combination with a slightly outward pull on the end 25 will automatically cause the nose bearing pads 18 to move to the desired position above the pivot 16, the said straps 21 being adapted to automatically function to limit said upward movement.

Although the nose bearing pads are described as preferably being pivotally connected with the arms 17, it is to be understood that they may be rigidly attached thereto if desired.

The auxiliary bridge, comprising the central arch portion 14 and the depending side portions 15, is preferably formed of material which has a resistance to bending and distortion, and will thereby have the desired rigidity to retain the parts in properly fitted and controlled relation with each other.

As stated above, the arm 23 is formed of a material which is resilient and is preferably of such a yielding nature as to permit the latch 24 to be engaged with the central arch portion 3 without distorting the remaining parts of the auxiliary bridge. In instances when more than one notch 24 is formed longitudinally on the arm 23, such an arm is preferably for use with lenses having a plurality of different focal fields so that each selected focal field may be adjusted to a comfortable position of use before the eyes.

From the foregoing description, it will be seen that simple, efficient, and economical means have been provided for accomplishing all of the objects and advantages of the invention.

Having described my invention, I claim:

1. An ophthalmic mounting comprising a pair of lens holding members, a main bridge member having a central arch portion connecting said lens holding members, an auxiliary bridge pivotally connected to the mounting adjacent the ends of the bridge member, said auxiliary bridge member having rearwardly extending nose pad supporting arms, said supporting arms having an intermediate portion deflected for engagement with the mounting adjacent the main bridge, and functioning as stop means in one position of adjustment, nose bearing pads attached to said arms, and resiliently supported notched latch means carried by the central portion of said auxiliary bridge for engaging the central arch portion of the main bridge member in one position of adjustment of the nose bearing pads for supporting said pads in said adjusted position.

2. In an ophthalmic mounting embodying temples, the combination of a main bridge member, pivot bearing members adjacent the opposite sides of said main bridge member, an auxiliary bridge pivotally attached to said pivot bearing members, nose bearing pads carried by said auxiliary bridge member and movable with said bridge member to positions above or below the axes of said pivots, stop means functioning cooperatively with the action of gravity and the pull of the temples to limit and retain the uppermost position of adjustment of the nose pads and a resiliently supported latch member carried by said auxiliary bridge having a notched portion shaped to grip and adapted to interlock with the main bridge member when the nose bearing pads are moved in the direction of their lowermost position of adjustment for retaining said pads in said adjusted position.

3. An ophthalmic mounting comprising a pair of lens holding members, a main bridge member having a central arch portion connecting said lens holding members, an auxiliary bridge pivotally connected to the mounting adjacent the ends of the bridge member, said auxiliary bridge member having rearwardly extending nose pad supporting arms, said supporting arms having an intermediate portion deflected in a sidewise direction for engagement with the mounting adjacent the main bridge, and functioning as stop means in one position of adjustment of said auxiliary bridge and supporting arms carried thereby, nose bearing pads attached to said arms, said deflected portions of the nose pad supporting arms functioning to limit the upward movement of said pads in one position of adjustment of the auxiliary bridge, and a resiliently supported latch member connected with the central portion of the auxiliary bridge and having a portion shaped to grip the central arch portion of the main bridge member to retain said pads in their lowermost adjusted position.

4. An ophthalmic mounting comprising a pair of lens holding members, a main bridge member having a central arch portion connecting said lens holding members, an auxiliary bridge pivotally connected to the mounting adjacent the ends of the bridge member, said auxiliary bridge member having rearwardly extending nose pad supporting arms, said supporting arms having intermediate loop portions disposed in a sidewise direction for engagement with the mounting adjacent the main bridge member and functioning as stop means in one position of adjustment, nose bearing pads attached to said arms and a member attached to the central portion of said auxiliary bridge having a resilient nature and having a recessed end portion shaped to engage and grip the central arch portion of the main bridge member in another position of adjustment of said auxiliary bridge member and having a side surface portion adapted to engage the lower surface of the central arch portion of the main bridge member to bring about a resilient yielding of said member attached to the central portion of said auxiliary bridge to guide the recessed end thereof into gripping relation with said central arch portion of the main bridge member.

5. An ophthalmic mounting comprising a pair of lens holding members, lenses in said lens holding members, a main bridge member having a central arch portion for connecting said lens holding members, an auxiliary bridge having rearwardly extending nose pad supporting arms pivotally connected to the mounting adjacent the ends of said main bridge member, nose bearing pads connected to said arm members and a forwardly extending member attached to the central portion of said auxiliary bridge having a resilient nature and having a recessed end portion shaped to engage and grip the central arch portion of the main bridge member when the arm members carrying the nose pads are moved in a downward direction, said forwardly extending member having a side surface portion adjacent the recessed end adapted to engage the lower surface of the central arch portion of the main bridge member to bring about a resilient yielding of said forwardly extending member to guide the recessed end thereof into gripping relation with the central arch portion of the main bridge member.

JOSEPH E. HIGGINS.